(12) United States Patent
Kato et al.

(10) Patent No.: US 6,712,879 B2
(45) Date of Patent: Mar. 30, 2004

(54) CARBON DIOXIDE GAS ABSORBENT AND CARBON DIOXIDE GAS SEPARATING APPARATUS

(75) Inventors: Masahiro Kato, Naka-gun (JP); Sawako Yoshikawa, Yokohama (JP); Kenji Essaki, Yokohama (JP); Kazuaki Nakagawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/235,663

(22) Filed: Sep. 6, 2002

(65) Prior Publication Data
US 2003/0075050 A1 Apr. 24, 2003

(30) Foreign Application Priority Data
Sep. 28, 2001 (JP) ............................. 2001-299131

(51) Int. Cl.$^7$ ............................. B01D 53/04; B01D 53/62
(52) U.S. Cl. .............................. 95/139; 96/143; 96/146; 423/230; 502/400
(58) Field of Search ............................. 95/139; 96/108, 96/121, 146, 153, 143; 423/230; 502/400

(56) References Cited

U.S. PATENT DOCUMENTS

| | | | | |
|---|---|---|---|---|
| 3,619,130 A | * | 11/1971 | Ventriglio et al. | 95/115 |
| 3,906,945 A | * | 9/1975 | Netteland et al. | 128/205.28 |
| 4,725,415 A | * | 2/1988 | Kidd | 423/230 |
| 5,145,657 A | * | 9/1992 | Kobayashi et al. | 423/219 |
| 5,214,019 A | * | 5/1993 | Nalette et al. | 502/400 |
| 5,866,090 A | | 2/1999 | Nakagawa et al. | 423/230 |
| 6,024,774 A | | 2/2000 | Nakagawa et al. | 48/198.3 |
| 6,271,172 B2 | | 8/2001 | Ohashi et al. | 502/400 |
| 6,280,503 B1 | * | 8/2001 | Mayorga et al. | 95/96 |
| 6,387,337 B1 | * | 5/2002 | Pennline et al. | 423/220 |
| 6,387,845 B1 | | 5/2002 | Masahiro et al. | 502/407 |
| 2001/0001782 A1 | * | 5/2001 | Ohashi et al. | 502/400 |

* cited by examiner

Primary Examiner—Robert H. Spitzer
(74) Attorney, Agent, or Firm—Oblon, Spivak, McClelland, Maier & Neustadt, P.C.

(57) ABSTRACT

There is disclosed a carbon dioxide gas absorbent comprising lithium silicate, 0.5 mol % to 4.9 mol % of alkali carbonate per mole of the lithium silicate, and at least one element selected from the group consisting of aluminum, magnesium, calcium, iron, titanium and carbon.

20 Claims, 1 Drawing Sheet

CARBON DIOXIDE GAS ABSORBENT AND CARBON DIOXIDE GAS SEPARATING APPARATUS

CROSS-REFERENCE TO RELATED APPLICATIONS

This application is based upon and claims the benefit of priority from the prior Japanese Patent Application No. 2001-299131, filed Sep. 28, 2001, the entire contents of which are incorporated by reference.

BACKGROUND OF THE INVENTION

1. Field of the Invention

This invention relates to a carbon dioxide gas absorbent and a carbon dioxide gas separating apparatus.

2. Description of the Related Art

If it is desired to perform the separation and recovery of carbon dioxide gas from the exhaust gas that has been discharged from a combustion apparatus such as an engine where a fuel containing mainly of hydrocarbons is combusted, it is effective to perform the separation and recovery of carbon dioxide gas at a location which is close to the combustion chamber and therefore is high in the concentration of carbon dioxide gas. Since this location which is close to the combustion chamber is relatively high in temperature, unless the exhaust gas discharged from the combustion chamber is cooled by a heat exchanger, etc., the separation and recovery of carbon dioxide gas is inevitably required to be performed under an environment of about 300° C. or more.

As for the method of separating and recovering carbon dioxide gas, there have been conventionally proposed various methods such as a method where cellulose acetate is employed, a method where an alkanol amine type solvent is employed, and a chemical absorption method where carbon dioxide is absorbed by using a solution. In any of these conventional carbon dioxide gas separation/recovery methods, the absorption of carbon dioxide gas is performed at a temperature of about 200° C. or less. Because of this, the temperature of the exhaust gas containing carbon dioxide gas on the occasion of introducing it into an absorption system is required to be controlled to be about 200° C. or less. Therefore, the exhaust gas having a high concentration of carbon dioxide gas and existing in the vicinity of the combustion chamber is required to be cooled to a temperature of about 200° C. or less by a heat exchanger, etc. before the carbon dioxide gas is to be separated and recovered. As a result, there is a problem that the energy consumption for the separation and recovery of carbon dioxide is inevitably increased.

On the other hand, Jpn. Pat. Appln. KOKAI Publication No. 9-99214 discloses a carbon dioxide gas absorbent comprising lithium zirconate. Further, Jpn. Pat. Appln. KOKAI Publication No. 2000-262,890 and Jpn. Pat. Appln. KOKAI Publication No. 2001-170,480 discloses a carbon dioxide gas absorbent comprising lithium silicate. Lithium zirconate and lithium silicate are capable of absorbing carbon dioxide gas at temperatures exceeding about 500° C. Further, when lithium zirconate and lithium silicate are heated to a temperature of 600° C. or more, carbon dioxide is desorbed therefrom. Moreover, when at least one kind of alkali carbonate selected from the group consisting of lithium carbonate, potassium carbonate and sodium carbonate is added to lithium zirconate and lithium silicate, the carbon dioxide gas-absorbing property of the carbon dioxide gas absorbent can be improved, so that it becomes possible to effectively absorb carbon dioxide gas even if carbon dioxide is of low concentration.

However, these conventional carbon dioxide gas absorbents incorporating alkali carbonates are accompanied with problems that the serviceable life thereof is relatively short, and that if the separation and recovery of carbon dioxide gas are to be performed using these conventional carbon dioxide gas absorbents, it requires a relatively high temperature for releasing carbon dioxide gas from the carbon dioxide gas absorbent.

BRIEF SUMMARY OF THE INVENTION

Therefore, an object of the present invention is to provide a carbon dioxide gas absorbent which is long in serviceable life.

A further object of the present invention is to provide a carbon dioxide gas separating apparatus which is capable of effectively performing the separation and recovery of carbon dioxide gas.

According to one aspect of the present invention, there is provided a carbon dioxide gas absorbent comprising:

lithium silicate;

0.5 mol % to 4.9 mol % of alkali carbonate per mole of the lithium silicate; and at least one element selected from the group consisting of aluminum, magnesium, calcium, iron, titanium and carbon.

According to another aspect of the present invention, there is provided a carbon dioxide gas separating apparatus comprising:

a reaction chamber having a carbon dioxide gas inlet and a product gas outlet;

a carbon dioxide gas absorbent placed in the reaction chamber; the carbon dioxide gas absorbent comprising lithium silicate; 0.5 mol % to 4.9 mol % of alkali carbonate per mole of the lithium silicate; and at least one element selected from the group consisting of aluminum, magnesium, calcium, iron, titanium and carbon; and a heater heating the reaction chamber and disposed around the reaction chamber.

DETAILED DESCRIPTION OF THE INVENTION

Figure 1:
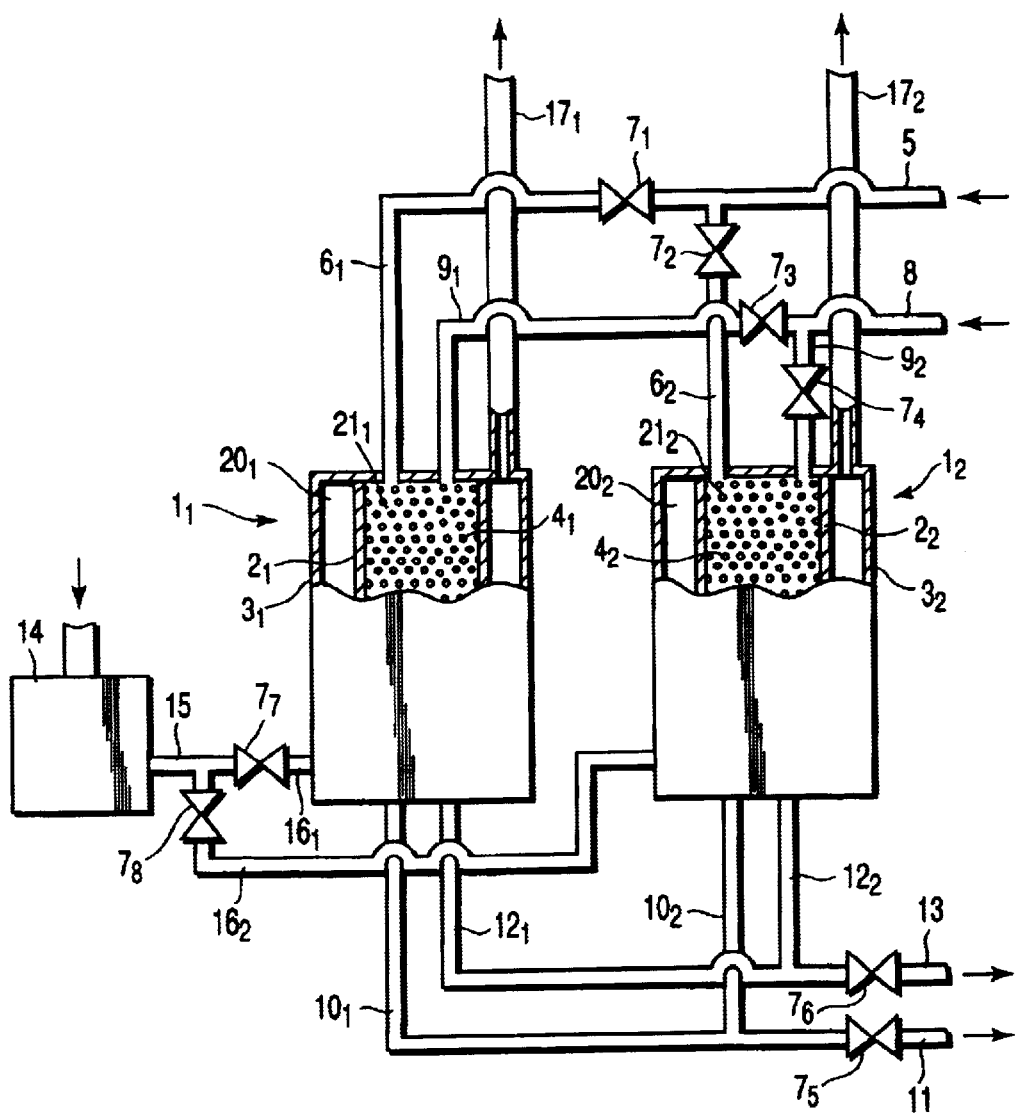
FIG. 1 schematically illustrates a carbon dioxide gas separating apparatus according to one embodiment of the present invention.

When an alkali carbonate is incorporated, according to the conventional procedure, into lithium silicate employed as a carbon dioxide gas absorbent, the following problems occur. More specifically, a relatively long time and a high temperature are required for effecting the carbon dioxide gas-releasing reaction. If the carbon dioxide gas-releasing reaction is continued to proceed at a relatively high temperature, the grains of the carbon dioxide gas absorbent become larger, which decreases the porosity of the carbon dioxide gas absorbent, so that the carbon dioxide absorption/desorption characteristics of the carbon dioxide gas absorbent is deteriorated, thus shortening the serviceable life thereof.

With a view to investigate the cause of this phenomenon, the present inventors have analyzed the interface of grains of the carbon dioxide gas absorbent after permitting carbon dioxide gas to be absorbed therein and found the following facts. Namely, there was recognized, on the interface of the grains of the carbon dioxide gas absorbent, the formation of a film comprising a reaction product formed through a reaction between impurities included in the carbon dioxide gas absorbent and the alkali carbonate which was incorporated into the carbon dioxide gas absorbent for promoting the absorption of carbon dioxide. As carbon dioxide gas is absorbed by the carbon dioxide gas absorbent, solid lithium carbonate is formed on the surface of the carbon dioxide gas absorbent. In this case, alkali carbonate functions to liquefy this solid lithium carbonate formed as mentioned above, thereby enhancing the diffusing rate of carbon dioxide gas onto the surface of the carbon dioxide gas absorbent. However, this liquefied lithium carbonate concurrently reacts with the aforementioned impurities to form a film.

When this film is heated higher than the melting point thereof, it can be liquefied, but when this film is kept lower than the melting point thereof, the carbon dioxide gas-releasing reaction in the carbon dioxide gas absorbent is prevented. Therefore, in order to enable the absorbed carbon dioxide gas to be completely desorbed, the carbon dioxide gas absorbent is required to be heated up to a temperature which enables the film to be liquefied. Since a relatively high temperature is required for enabling the carbon dioxide gas-releasing reaction to take place as described above, the grains of the carbon dioxide gas absorbent grow, thereby degrading the carbon dioxide gas absorbent and hence shorten the serviceable life of the carbon dioxide gas absorbent.

As for the aforementioned impurities that may be included in the carbon dioxide gas absorbent and forming the film together with alkali carbonate, they include at least one kind of material selected from the group consisting of aluminum, magnesium, calcium, iron, titanium and carbon. These impurities originate from the raw materials of the carbon dioxide gas absorbent, i.e. silicon dioxide and lithium carbonate, or from the course of processing. These impurities are unavoidably included in the carbon dioxide gas absorbent.

In order to enable alkali carbonate to function as an accelerator for the carbon dioxide gas-absorbing reaction, the content of alkali carbonate in the lithium silicate is required to be at least about 0.5 mol %. Further, it has been found by the present inventors that in order to prevent the carbon dioxide gas absorbent from being deteriorated in carbon dioxide gas-releasing property thereof even if the carbon dioxide gas absorbent contains an unavoidable impurity, the content of alkali carbonate in the lithium silicate is required to be limited to a certain level. Namely, when the content of alkali carbonate in the lithium silicate exceeds about 4.9 mol %, the melting point of the film to be formed through the reaction between an impurity and an alkali carbonate is sharply raised to as high as 850° C. or so. As a result, the carbon dioxide gas-releasing property of the carbon dioxide gas absorbent is deteriorated. Therefore, in the carbon dioxide gas absorbent according to the embodiments of the present invention, the content of alkali carbonate should preferably be confined within the range of about 0.5 mol % to about 4.9 mol %. In the carbon dioxide gas absorbent according to the embodiments of the present invention, it may contain, as an impurity, at least one kind of element selected from the group consisting of aluminum, magnesium, calcium, iron, titanium and carbon.

When the content of an alkali carbonate is confined within the range of about 0.5 mol % to about 4.9 mol %, a carbon dioxide gas absorbent having a long serviceable life can be obtained. The carbon dioxide gas absorbent confined in this manner is excellent in carbon dioxide gas-absorbing property in a temperature range which is as high as around 500° C. and also in carbon dioxide gas-releasing property in a temperature range exceeding over about 700° C. If it is desired to enable the carbon dioxide gas-releasing reaction to be effectively executed in the carbon dioxide gas absorbent, the content of the alkali carbonate should preferably be confined within the range of about 1 mol % to about 3 mol %.

The lithium silicate to be employed in the carbon dioxide gas absorbent is capable of efficiently reacting with carbon dioxide gas at temperatures of around 500° C. to generate silicon dioxide and lithium carbonate, thereby absorbing carbon dioxide gas. Since this reaction is reversible, silicon dioxide and lithium carbonate react with each other at a temperature of about 700° C. to generate lithium silicate and carbon dioxide gas. Since lithium silicate is capable of selectively absorbing carbon dioxide gas and also capable of desorbing the carbon dioxide gas that has been once absorbed therein, it becomes possible to recycle the carbon dioxide gas that has been separated and recovered by the lithium silicate. Further, since this carbon dioxide gas absorbent is capable of reversibly absorbing and desorbing carbon dioxide gas, it can be repeatedly used.

Moreover, the carbon dioxide gas absorbent according to the embodiments of the present invention is capable of absorbing carbon dioxide gas even at room temperature. In this case also, it is possible to separate the carbon dioxide gas that has been once absorbed by the carbon dioxide gas absorbent from lithium silicate by heating the carbon dioxide gas absorbent up to a temperature of about 700° C. as mentioned above.

As for the lithium silicate, it is possible to employ a compound represented by a formula: $Li_xSi_yO_z$ (wherein x+4y−2z=0). For example, it is possible to employ at least one kind of compound selected from the group consisting of lithium orthosilicate ($Li_4SiO_4$), lithium metasilicate ($Li_2SiO_3$), $Li_6Si_2O_7$ and $Li_8SiO_6$. These various kinds of lithium silicate may be employed singly or in a combination of two or more kinds. Among them, due to the features that the temperature that makes a boundary point between the absorption of carbon dioxide gas and the desorption of carbon dioxide gas relatively high and hence the separation of carbon dioxide gas can be executed at relatively high temperature, the employment of lithium orthosilicate is especially preferable. Incidentally, these various kinds of lithium silicate may differ more or less in composition from the stoichiometric ratio in the chemical formula.

As for the alkali carbonate, it is possible to employ at least one selected from the group consisting of potassium carbonate, sodium carbonate and lithium carbonate. These various kinds of alkali carbonate may be employed singly or in a combination of two or more kinds. Among them, because of the features that the carbon dioxide gas absorbing property is relatively high, the employment of potassium carbonate is especially preferable. Incidentally, these various kinds of alkali carbonate may differ more or less in composition from the stoichiometric ratio in the chemical formula.

The carbon dioxide gas absorbent according to the embodiments of the present invention can be employed in the form of powder or in the form of a porous body. A mixture comprising powdery one and porous one may be used. The porous carbon dioxide gas absorbent can be formed by compressing the powder of the carbon dioxide gas absorbent to such an extent that enables carbon dioxide gas to pass through the interior of the resultant compressed body. If the carbon dioxide gas absorbent is to be employed in the form of powder, the packing quantity of the carbon dioxide gas absorbent into the interior of the chamber can be increased, thus preferably increasing the absorption quantity of carbon dioxide gas. On the other hand, if the carbon dioxide gas absorbent is to be employed in the form of a porous body, the clogging of the carbon dioxide gas absorbent by an exhaust gas flow of high flow rate can be minimized, thus preferably minimizing the pressure loss of the gas flow. Irrespective of whether the carbon dioxide gas absorbent is employed in the form of powder or the carbon dioxide gas absorbent is employed in the form of a porous body by molding the powder thereof, it is required to suppress the aggregation of the powder of the carbon dioxide gas absorbent and also to increase the contacting surface thereof with an exhaust gas. Because of this, the average particle diameter of the powder should preferably be confined within the range of about 0.5 $\mu$m to about 50 $\mu$m. The average particle diameter of the powder can be measured by a laser diffraction method.

On the occasion of forming a porous body from the powder thereof, it is required to form the porous body in such a manner that the resultant porous body is capable of suppressing the pressure loss of gas flow and capable of retaining the mechanical strength to a certain extent. Therefore, it is preferable that the porosity of the porous body is confined within the range of about 30% to about 60%. Where the carbon dioxide gas absorbent is to be employed in the form of a porous body, alkali carbonate can be retained by the fine pores or fine voids of the porous body, so that the external dimensions of the porous body need hardly to be changed.

The carbon dioxide gas absorbent having such a porous structure as described above can be manufactured by the following method.

First of all, predetermined quantities of silicon dioxide and lithium carbonate are weighed-out, and are then mixed together for about 0.1 to 1.0 hours by using an agate mortar. The resultant mixed powder is placed in an alumina crucible and heat-treated for about 0.5 to 20 hours in an air atmosphere in a box type electric furnace. As a result, a raw lithium silicate powder can be obtained. Then, a predetermined quantity of potassium carbonate is added as an alkali carbonate to this raw lithium silicate powder and dry-mixed to obtain a mixture. Thereafter, a predetermined quantity of the mixture comprising lithium silicate and potassium carbonate is weighed and introduced into a mold. The mixture is then press-molded to form a molded body having a porosity of about 40%, thereby obtaining a porous body of the carbon dioxide gas absorbent.

The carbon dioxide gas absorbent according to the embodiments of the present invention can be used in a carbon dioxide gas separating apparatus as explained below.

FIG. 1 is a cross-sectional view schematically illustrating a carbon dioxide gas separating apparatus according to one embodiment of the present invention.

A first absorption pipe $1_1$ and a second absorption pipe $1_2$ are respectively formed of a double structure, each comprising an inner pipe $2_1$ and an outer pipe $3_1$ and an inner pipe $2_2$ and an outer pipe $3_2$. The inner spaces of the inner pipes $2_1$ and $2_2$ constitute a first reaction chamber $21_1$ and a second reaction chamber $21_2$, respectively, while the spaces formed between the inner pipes $2_1$ and $2_2$ and the outer pipes $3_1$ and $3_2$ constitute a first heater (heating means) $20_1$ and a second heater (heating means) $20_2$, respectively. The first and second reaction chambers $21_1$ and $21_2$ are heated by the first and second heaters $20_1$ and $20_2$, respectively.

The first and second reaction chambers $21_1$ and $21_2$ are filled with a carbon dioxide gas absorbent as represented by $4_1$ and $4_2$, respectively. A first and second carbon dioxide gas-containing gas supply branch pipes $6_1$ and $6_2$, both branched from a carbon dioxide gas-containing gas supply pipe 5, are respectively coupled with an upper end of each of the first and second reaction chambers $21_1$ and $21_2$. The first and second carbon dioxide gas-containing gas supply branch pipes $6_1$ and $6_2$ are provided with a first valve $7_1$ and a second valve $7_2$ respectively.

A first and second recovering gas supply branch pipes $9_1$ and $9_2$ both branched from a carbon dioxide gas-recovering gas supply pipe 8, are coupled with an upper end of each of the first and second reaction chambers $21_1$ and $21_2$, respectively. The first and second recovering gas supply branch pipes $9_1$ and $9_2$ are provided with a third valve $7_3$ and a fourth valve $7_4$, respectively.

One end of each of a first and second gas discharge branch pipes $10_1$ and $10_2$ is coupled with a bottom portion of each of the first and second reaction chambers $21_1$ and $21_2$, while the other end of each of the first and second gas discharge branch pipes $10_1$ and $10_2$ is coupled with a processed gas discharge pipe 11 which is provided with a fifth valve $7_5$. One end of each of a first and second recovering gas discharge branch pipes $12_1$ and $12_2$ is coupled with a bottom portion of each of the first and second reaction chambers $21_1$ and $21_2$, while the other end of each of the first and second recovering gas discharge branch pipes $12_1$ and $12_2$ is coupled with a recovering gas discharge pipe 13 which is provided with a sixth valve $7_6$.

A combustor 14 for combusting a fuel gas is disposed next to the first absorption pipe $1_1$. One end of a combustion gas supply pipe 15 is coupled with the combustor 14, while the other end of the combustion gas supply pipe 15 is diverged into a first and second combustion gas supply branch pipes $16_1$ and $16_2$. The first and second combustion gas supply branch pipes $16_1$ and $16_2$ are coupled with a lower sidewall of each of the first and second heaters $20_1$ and $20_2$, respectively, and provided with a seventh and eighth valves $7_7$ and $7_8$ respectively.

First and second exhaust pipes $17_1$ and $17_2$ are communicated with the first and second heaters $20_1$ and $20_2$, respectively. As a fuel gas is introduced into the combustor 14 and combusted therein, the combustion gas generated by the combustion of the fuel gas is transferred, via the combustion gas supply pipe 15 and the first and second combustion gas supply branch pipes $16_1$ and $16_2$, to the first and second heaters $20_1$ and $20_2$, respectively. The combustion gas is permitted to flow through the inner space of the first and second heaters $20_1$ and $20_2$ and is discharged from the first and second exhaust pipes $17_1$ and $17_2$. During the time when the combustion gas passes through the aforementioned inner space, the carbon dioxide gas absorbents $4_1$ and $4_2$ loaded inside the first and second reaction chambers $21_1$ and $21_2$ are heated.

The number of moles per unit time of the gas flowing through the first and second reaction chambers $21_1$ and $21_2$ should preferably be set to about four to about 50 times larger than the number of moles of the carbon dioxide gas absorbents $4_1$ and $4_2$ loaded therein. When the number of moles per unit time of the gas flow exceeds over 50 times, it becomes difficult to effectively perform the absorption of carbon dioxide gas in view of the capacity utilization of the first and second reaction chambers $21_1$ and $21_2$. On the other hand, when the number of moles per unit time of the gas flow is less than about 4 times, the generation of heat due to the absorption reaction becomes excessive to raise the temperature of the gas flow, thus possibly obstructing the absorption reaction itself. In view of both of the utilization efficiency of the capacity of the reaction chamber and the rapid progress of the absorption reaction, it is more preferable to confine the number of moles per unit time of the gas flowing to about 8 to about 30 times larger than the number of moles of the carbon dioxide gas absorbents $4_1$ and $4_2$ loaded therein.

It is possible, through the employment of the first and second reaction chambers $21_1$ and $21_2$ filled with the carbon dioxide gas absorbents $4_1$ and $4_2$ to continuously perform the absorption and recovery of carbon dioxide gas by alternately executing the carbon dioxide gas absorption reaction and the carbon dioxide gas desorption reaction by following the procedures (1-1) and (1-2) as explained below.

(1-1)The Procedure of Carbon Dioxide Gas Absorption at the First Absorption Pipe $1_1$:

First of all, the first valve $7_1$ mounted on the first carbon dioxide gas-containing gas supply branch pipe $6_1$ which is coupled with the first reaction chamber $21_1$ and the fifth valve $7_5$ mounted on the processed gas discharge pipe 11 are opened while closing all of the other valves, i.e. valves $7_2$, $7_3$, $7_4$, $7_6$, $7_7$ and $7_8$ A carbon dioxide gas-containing gas is then permitted to flow from the carbon dioxide gas-containing gas supply pipe 5, via the first carbon dioxide gas-containing gas supply branch pipe $6_1$, to the first reaction chamber $21_1$. In this case, as mentioned above, the number of moles per unit time of the gas flowing through the first reaction chamber $21_1$ is set to about 4 to about 50 times larger than the number of moles of the lithium silicate being filled in the first reaction chamber $21_1$. As a result, it is possible to enable the carbon dioxide gas in the carbon dioxide gas-containing gas to be rapidly absorbed and retained by the carbon dioxide gas absorbent $4_1$. The gas where the concentration of carbon dioxide gas is reduced in this manner is permitted to pass through the first gas discharge branch pipe $10_1$ and the processed gas discharge pipe 11 so as to be discharged out of the system.

The absorption of carbon dioxide gas at the second absorption pipe $1_2$ can be performed in the same manner as described above.

(1-2)The Procedure of the Recovery of Carbon Dioxide Gas at the Second Absorption Pipe $1_2$:

During the time when the procedure of carbon dioxide gas absorption is being performed at the first absorption pipe $1_1$ as explained in the above item (1-1), the fourth valve $7_4$ mounted on the second recovering gas supply branch pipe $9_2$ which is coupled with the second absorption pipe $1_2$ and the sixth valve $7_6$ mounted on the recovering gas discharge pipe 13, and the eighth valve $7_8$ mounted on the second combustion gas supply branch pipe $16_2$ are opened.

Subsequently, the combustion gas from the combustor 14 is passed, via the combustion gas supply pipe 15 and the second combustion gas supply branch pipe $16_2$, to the second heater $20_2$. As a result, the carbon dioxide gas absorbent $4_2$ loaded in the second reaction chamber $21_2$ is heated up to about 800° C. or more, and at the same time, a desired recovering gas is fed from the carbon dioxide gas-recovering gas supply pipe 8, via the second recovering gas supply branch pipe $9_2$, to the second reaction chamber $21_2$. On this occasion, the carbon dioxide gas that has already been absorbed by the carbon dioxide gas absorbent $4_2$ is rapidly released due to the generation of carbon dioxide desorption reaction, and the gas flow containing a high concentration of carbon dioxide gas is recovered by the second recovering gas discharge branch pipe $12_2$ and the recovering gas discharge pipe 13.

The recovery of carbon dioxide gas from the first absorption pipe $1_1$ can be performed in the same manner as explained above.

As described above, on the occasion of performing the carbon dioxide gas absorption procedure at the first absorption pipe $1_1$, the procedure of recovering carbon dioxide gas from the second absorption pipe $1_2$ can be performed concurrent therewith. Further, on the occasion of the procedure to recover carbon dioxide gas from the first absorption pipe $1_1$, the procedure of absorbing carbon dioxide gas at the second absorption pipe $1_2$ can be performed concurrent therewith. It is possible, by alternately repeating these procedures, to realize a continuous separation of carbon dioxide gas.

Any of the inner pipes $2_1$ and $2_2$, the outer pipes $3_1$ and $3_2$ the first and second carbon dioxide gas-containing gas supply branch pipes $6_1$ and $6_2$, the first and second recovering gas supply branch pipes $9_1$ and $9_2$ the first and second gas discharge branch pipes $10_1$ and $10_2$, and the first and second recovering gas discharge branch pipes $12_1$ and $12_2$ can be constituted by any desired material. For example, high-density alumina, and metals such as nickel and iron can be employed for constituting these members. Further, in order to effectively isolate carbon dioxide gas to be generated in the first and second reaction chambers $21_1$ and $21_2$, it is preferable to increase the capacity of the first and second heaters $20_1$ and $20_2$. Further, if it is desired to prolong the contact time between the fuel gas and the carbon dioxide gas absorbents $4_1$ and $4_2$ the employment of a tubular configuration extended in the direction of the gas flow would be desirable for shape of the first and second chambers $21_1$ and $21_2$.

Additionally, depending on the reaction temperature of the raw gas, a temperature controller such as a heater may be installed inside or outside the reaction chamber so as to make it possible, if desired, to set the temperature of the interior of the reaction chamber to a desired temperature.

As explained above, it is possible, according to the embodiment of the present invention, to provide a carbon dioxide gas separating apparatus which is simple in structure, cheap in manufacturing cost, and capable of continuously performing the separation and recovery of carbon dioxide gas. Furthermore, since a carbon dioxide gas absorbent having a long serviceable life can be employed in the embodiment, the separation and recovery of carbon dioxide gas can be effectively performed.

Next, specific examples of the present invention will be explained in detail.

EXAMPLE I-1

Lithium carbonate powder having an average particle diameter of about 1 μm, and silicon dioxide powder having an average particle diameter of about 0.8 μm were weighed so as to make the molar ratio thereof about 2:1. Then, these raw materials were dry-mixed in an agate mortar for about 10 minutes to obtain a mixture, which was then heat-treated at a temperature of about 1,000° C. for about 8 hours in an air atmosphere in a box type electric furnace to obtain lithium orthosilicate powder.

Then, potassium carbonate having an average particle diameter of about 1 μm was added to this lithium orthosilicate powder at a ratio of about 2 mol % and dry-mixed in an agate mortar. Thereafter, the mixture comprising lithium silicate and potassium carbonate was introduced into a mold having a diameter of about 12 mm. The mixture is then press-molded to form a porous carbon dioxide gas absorbent having a porosity of about 40%.

It was found that this porous carbon dioxide gas absorbent contained as an impurity about 550 ppm of aluminum, about 220 ppm of magnesium, about 500 ppm of calcium, about 50 ppm of iron, and about 50 ppm of titanium.

EXAMPLES I-2 to I-6, AND COMPARATIVE EXAMPLES I-1 AND I-2

Various kinds of porous carbon dioxide gas absorbents were manufactured by repeating the same procedures and using the materials as described in Example I-1, except that the kind and the content of alkali carbonate was varied as shown in the following Table 1. Since these carbon dioxide gas absorbents were prepared by the same process using the same materials as described in Example I-1, almost the quantity and kinds of impurities were included therein as an impurity.

TABLE 1

|  | Alkali carbonates | |
| --- | --- | --- |
|  | Kinds | Content (mol %) |
| Example I-1 | $K_2CO_3$ | 2 |
| Example I-2 | $K_2CO_3$ | 0.5 |
| Example I-3 | $K_2CO_3$ | 1 |
| Example I-4 | $K_2CO_3$ | 3 |
| Example I-5 | $K_2CO_3$ | 4.9 |
| Example I-6 | $Na_2CO_3$ | 2 |
| Comparative Example I-1 | $K_2CO_3$ | 5 |
| Comparative Example I-2 | $K_2CO_3$ | 0.3 |

The carbon dioxide gas absorbents obtained in Examples I-1 to I-6, and Comparative Examples I-1 and I-2 were respectively housed inside the box type electric furnace. Then, this electric furnace was maintained at a temperature of about 500° C. while permitting a mixed gas comprising about 20 vol % of carbon dioxide gas and about 80 vol % of nitrogen gas to flow therethrough. Then, the time where the weight of the carbon dioxide gas absorbent that had absorbed carbon dioxide gas was increased to about 130 wt % of the initial weight was measured to evaluate the carbon dioxide gas-absorption performance of these carbon dioxide gas absorbents.

Further, after having carbon dioxide gas absorbed therein under the aforementioned conditions, these carbon dioxide gas absorbents were once cooled to room temperature to measure the weight thereof. Thereafter, these carbon dioxide gas absorbents were kept at a temperature of about 800° C. under a gaseous condition where carbon dioxide gas was set about 100 vol % to measure the reduction of the weight thereof, thus evaluating the carbon dioxide gas-desorption performance of these carbon dioxide gas absorbents. Since the gaseous condition in this experiment was set to such that carbon dioxide gas was about 100 vol %, the carbon dioxide gas desorption reaction was performed at a temperature of about 800° C. However, the temperature of the carbon dioxide gas desorption reaction can be varied depending on this gaseous condition.

Additionally, the melting point of the films formed on the surfaces of these carbon dioxide gas absorbents was also measured.

Moreover, the following test was also performed to evaluate the serviceable life of these carbon dioxide gas absorbents.

First of all, the carbon dioxide gas absorbents obtained in Examples I-1 to I-6, and Comparative Examples I-1 and I-2 were respectively housed inside the box type electric furnace. Then, this electric furnace was maintained at a temperature of about 500° C. for one hour while permitting a mixed gas comprising about 20 vol % of carbon dioxide gas and about 80 vol % of nitrogen gas to flow therethrough, thereby enabling carbon dioxide gas to be absorbed therein. Thereafter, these carbon dioxide gas absorbents were once cooled to room temperature to measure any increment of the weight thereof. Then, under a gaseous condition where carbon dioxide gas was set to about 100 vol %, the temperature of each of the carbon dioxide gas absorbents obtained in Examples and Comparative Examples was maintained at the melting point of each of the films formed on the surfaces of these carbon dioxide gas absorbents to permit carbon dioxide gas to be released therefrom for two hours. This experiment on the absorption and desorption of carbon dioxide gas in these carbon dioxide gas absorbents was repeated five times under the same conditions, and any increment of the weight thereof was respectively measured after finishing the fifth experiment. Then, the ratio of absorption of carbon dioxide gas, i.e. (the absorption at the fifth experiment/the absorption at the first experiment) was determined from the ratio of increment in weight of these carbon dioxide gas absorbents, i.e. (the absorption at the fifth experiment/the absorption at the first experiment).

The results are shown in the following Table 2.

Incidentally, when the same experiment as described above was performed by substituting nitrogen gas (without the inclusion of carbon dioxide gas) for the aforementioned mixed gas, any increase or decrease in weight was not recognized in these carbon dioxide gas absorbents.

TABLE 2

|  | Time required for attaining 130 wt % of initial weight (min) | Time required for completely releasing $CO_2$ (min) | Melting point of film (° C.) | Absorption ratio (5th/1st) |
| --- | --- | --- | --- | --- |
| Example I-1 | 45 | 30 | 765 | 0.95 |
| Example I-2 | 70 | 20 | 740 | 1 |
| Example I-3 | 60 | 25 | 750 | 1 |
| Example I-4 | 30 | 45 | 785 | 0.9 |
| Example I-5 | 25 | 60 | 800 | 0.8 |
| Example I-6 | 60 | 40 | 780 | 0.85 |
| Comparative Example I-1 | 20 | — | 850 | 0.25 |
| Comparative Example I-2 | 120 | 15 | 730 | 1 |

As shown in Table 2, the carbon dioxide gas absorbents according to Examples I-1 to I-6 were found to take a relatively short time for enabling carbon dioxide gas to be completely released therefrom. Whereas, it was impossible in the case of Comparative Example I-1 to completely release carbon dioxide gas therefrom at a temperature of about 800° C. Therefore, the carbon dioxide gas absorbents according to Examples I-1 to I-6 were confirmed as being excellent in carbon dioxide gas-desorption performance.

With respect to the melting point of the film formed, Examples I-1 to I-6 showed a relatively low temperature of about 800° C. or less. By contrast, the melting point of the film formed in Comparative Example I-1 was as high as about 850° C. When the carbon dioxide gas-desorption reaction was performed at the melting point of the film, the ratio of absorption of carbon dioxide gas, i.e. (the absorption at the fifth experiment/the absorption at the first experiment) was relatively large, thus indicating a negligible degradation of the absorbent.

Whereas, in the case of Comparative Example I-1, the quantity of the absorption of carbon dioxide gas at the fifth experiment was merely about 25% of that of the first experiment, thus indicating a substantial degradation of the absorbent. Further, since the melting point of the film is as high as about 850° C., the absorbent was considered as being deteriorated after several repetitions of the carbon dioxide gas absorption reaction.

In Comparative Example I-1, the content of potassium carbonate in the lithium silicate was 5 mol %. In Examples I-1 to I-6, the content of alkali carbonate in the lithium silicate was 4.9 mol % or less. Therefore, it will be clear that if it is desired to prolong the serviceable life of the carbon dioxide gas absorbent containing an impurity, the content of alkali carbonate in the lithium silicate should be confined to 4.9 mol %.

Further, the carbon dioxide gas absorbents according to Examples I-1 to I-6 were found to take a remarkably short time for enabling carbon dioxide gas to be absorbed therein as compared with that of Comparative Example I-2, thereby confirming an excellent carbon dioxide gas-absorbing performance of the absorbents according to Examples I-1 to I-6. The content of potassium carbonate in the lithium silicate of Comparative Example I-2 was only 0.3 mol %. Whereas, the content of alkali carbonate in the lithium silicate according to Examples I-1 to I-6 was 0.5 mol % or more. Therefore, it will be clear that if it is desired to enhance the carbon dioxide gas absorption performance of the carbon dioxide gas absorbent where an impurity such as aluminum is included therein, the content of alkali carbonate in the lithium silicate should be at least about 0.5 mol %.

It will be seen from Tables 1 and 2 that it is possible to obtain a carbon dioxide gas absorbent which is better in serviceable life if the content of alkali carbonate in the lithium silicate is confined to the range of about 1 mol % to about 3 mol %.

EXAMPLE II

Lithium orthosilicate was prepared by following the same procedures as described in Example I-1. Then, to this lithium orthosilicate, alkali carbonates were added as shown in the following Table 3 to obtain the carbon dioxide gas absorbents of Examples II-1 to II-6 and of Comparative Examples II-1 and II-2.

TABLE 3

| | Alkali carbonates | |
|---|---|---|
| | Kinds | Content (mol %) |
| Example II-1 | $K_2CO_3$ | 2 |
| Example II-2 | $K_2CO_3$ | 0.5 |
| Example II-3 | $K_2CO_3$ | 1 |
| Example II-4 | $K_2CO_3$ | 3 |
| Example II-5 | $K_2CO_3$ | 4.9 |
| Example II-6 | $Na_2CO_3$ | 2 |
| Comparative Example II-1 | $K_2CO_3$ | 5 |
| Comparative Example II-2 | $K_2CO_3$ | 0.3 |

By using each of these carbon dioxide gas absorbents, the absorption of carbon dioxide gas was performed in an air flow containing 500 ppm of carbon dioxide gas and under the conditions of: 25° C. in temperature and 40% in humidity to evaluate the carbon dioxide gas-absorbing performance thereof. In this absorption of carbon dioxide gas at room temperature, an apparatus shown in FIG. 2 was employed.

Figure 2:
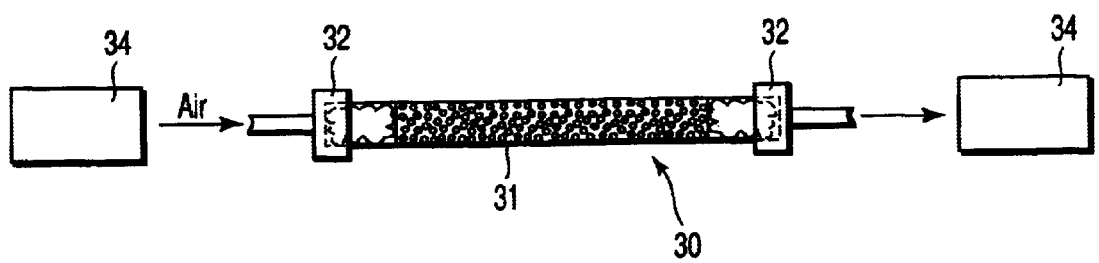
FIG. 2 schematically illustrates a carbon dioxide gas separating apparatus according to another embodiment of the present invention.

In the apparatus shown in FIG. 2, a resin tube 30 was filled with a carbon dioxide gas absorbent 31, and both ends of the tube 30 were sealed with an absorbent cotton 32. Air where the content of $CO_2$ gas therein was measured in advance was introduced into the tube 30 from one end thereof to perform the absorption of carbon dioxide gas. The air after the absorption of carbon dioxide gas was released from the other end of the tube 30 to measure the content of carbon dioxide gas included therein. For the measurement of the $CO_2$ gas content, a $CO_2$ densitometer 34 was used.

Thereafter, these carbon dioxide gas absorbents having carbon dioxide gas absorbed therein were respectively placed in an electric furnace and heated at a temperature of 800° C. under a gaseous condition where carbon dioxide gas was set to about 100 mol % to perform the desorption of carbon dioxide gas.

The carbon dioxide gas desorption performance was evaluated with respect to the following points.

(1) The time taken until the entrapment ratio of carbon dioxide gas became 80%.
(2) The time taken until the carbon dioxide gas was completely released.
(3) The melting point of the film formed on the surface of the carbon dioxide gas absorbent.
(4) The time taken until the entrapment ratio of carbon dioxide gas became 80% after five repetitions of the carbon dioxide gas absorption/desorption experiment.

Incidentally, the time until the entrapment ratio of carbon dioxide gas became 80% was obtained by calculating the ratio between the $CO_2$ concentration at the outlet port and the $CO_2$ concentration at the inlet port and plotting the concentrations versus time.

The time taken until the carbon dioxide gas was completely released was measured in the same manner as described above. The results are summarized in the following Table 4:

TABLE 4

|  | Time required for attaining 80% of entrapping ratio (min) | Time required for completely releasing $CO_2$ (min) | Melting point of film (°C.) | Ratio of time until entrapping ratio becomes 80% after 5 times of repetition |
|---|---|---|---|---|
| Example II-1 | 60 | 25 | 765 | 0.9 |
| Example II-2 | 30 | 17 | 740 | 0.95 |
| Example II-3 | 45 | 22 | 750 | 0.95 |
| Example II-4 | 90 | 40 | 785 | 0.85 |
| Example II-5 | 100 | 50 | 800 | 0.75 |
| Example II-6 | 55 | 34 | 780 | 0.8 |
| Comparative Example II-1 | 120 | — | 850 | 0.1 |
| Comparative Example II-2 | 10 | 13 | 730 | 0.95 |

As shown in Table 4, since the content of alkali carbonate in the lithium silicate according to Comparative Example II-1 was 5 mol %, a time of as long as 120 minutes was required until the entrapment ratio of carbon dioxide gas became 80%. However the melting point of the film formed was as high as 850≦ C. Therefore, it was impossible to completely release $CO_2$, thus resulting in the deterioration in repeatability. In the case of the carbon dioxide gas absorbent of Comparative Example II-2, since the content of alkali carbonate was 0.3 mol %, the time required until the entrapment ratio of carbon dioxide gas became 80% was relatively short and hence was defective in this respect.

Whereas, in the cases of carbon dioxide gas absorbents according to Examples II-1 to II-6 where the content of alkali carbonates in the lithium silicate was confined within the range of 0.5 mol % to 4.9 mol %, excellent results were obtained in all respects.

As explained above, it was confirmed that the carbon dioxide gas absorbents where the content of alkali carbonates in the lithium silicate was confined within the range of 0.5 mol % to 4.9 mol % were capable of excellent absorption of carbon dioxide gas even at room temperature, and that the serviceable life thereof was sufficiently long.

In the foregoing examples, only embodiments where lithium orthosilicate was employed as a lithium silicate, and potassium carbonate and sodium carbonate were employed as an alkali carbonate were illustrated. However, other materials selected from any kinds of lithium silicate and alkali carbonate may be used to obtain almost the same effects as mentioned above.

As explained above, it is possible, according to one aspect of the present invention, to provide a carbon dioxide gas absorbent which is sufficiently long in serviceable life. Further, it is also possible, according to another aspect of the present invention, to provide a carbon dioxide gas separating apparatus which is capable of effectively performing the separation and recovery of carbon dioxide gas.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon dioxide gas absorbent comprising:
lithium silicate;
0.5 mol% to 4.9 mol% of alkali carbonate per mole of said lithium silicate; and at least one element selected from the group consisting of aluminum, magnesium, calcium, iron, titanium and carbon.

2. The carbon dioxide gas absorbent according to claim 1, wherein the content of said alkali carbonate is in the range of 1 mol% to 3 mol% per mole of said lithium silicate.

3. The carbon dioxide gas absorbent according to claim 1, wherein said lithium silicate comprises at least one compound selected from the group consisting of $Li_4SiO_4$, $Li_2SiO_3$, $Li_6Si_2O_7$ and $Li_8SiO_6$.

4. The carbon dioxide gas absorbent according to claim 1, wherein said lithium silicate comprises $Li_4SiO_4$.

5. The carbon dioxide gas absorbent according to claim 1, wherein said alkali carbonate comprises at least one compound selected from the group consisting of potassium carbonate, sodium carbonate and lithium carbonate.

6. The carbon dioxide gas absorbent according to claim 5, wherein said alkali carbonate comprises potassium carbonate.

7. The carbon dioxide gas absorbent according to claim 1, which substantially assumes a powdery form.

8. The carbon dioxide gas absorbent according to claim 7, wherein said powdery form has an average particle diameter ranging from 0.5 $\mu$m to 50$\mu$m.

9. The carbon dioxide gas absorbent according to claim 1, which substantially assumes a porous form.

10. The carbon dioxide gas absorbent according to claim 9, wherein said porous form has a porosity ranging from 30% to 60%.

11. A carbon dioxide gas separating apparatus comprising:
a reaction chamber having a carbon dioxide gas inlet and a product gas outlet;
a carbon dioxide gas absorbent placed in said reaction chamber; said carbon dioxide gas absorbent comprising lithium silicate; 0.5 mol% to 4.9 mol% of alkali carbonate per mole of said lithium silicate; and at least one element selected from the group consisting of aluminum, magnesium, calcium, iron, titanium and carbon; and
a heater heating said reaction chamber and disposed around said reaction chamber.

12. The carbon dioxide gas separating apparatus according to claim 11, wherein the content of said alkali carbonate is in the range of 1 mol% to 3 mol% per mole of said lithium silicate.

13. The carbon dioxide gas separating apparatus according to claim 11, wherein said lithium silicate comprises at least one compound selected from the group consisting of $Li_4SiO_4$, $Li_2SiO_3$, $Li_6Si_2O_7$ and $Li_8SiO_6$.

14. The carbon dioxide gas separating apparatus according to claim 11, wherein said lithium silicate comprises $Li_4SiO_4$.

15. The carbon dioxide gas separating apparatus according to claim 11, wherein said alkali carbonate comprises at least one compound selected from the group consisting of potassium carbonate, sodium carbonate and lithium carbonate.

16. The carbon dioxide gas separating apparatus according to claim 15, wherein said alkali carbonate comprises potassium carbonate.

17. The carbon dioxide gas separating apparatus according to claim 11, wherein said carbon dioxide gas absorbent substantially assumes a powdery form.

18. The carbon dioxide gas separating apparatus according to claim 17, wherein said powdery form has an average particle diameter ranging from 0.5 $\mu$m to 50 $\mu$m.

19. The carbon dioxide gas separating apparatus according to claim 11, wherein said carbon dioxide gas absorbent substantially assumes a porous form.

20. The carbon dioxide gas separating apparatus according to claim 19, wherein said porous form has a porosity ranging from 30% to 60%.

* * * * *